United States Patent
Seo et al.

(10) Patent No.: US 12,118,251 B2
(45) Date of Patent: Oct. 15, 2024

(54) MULTI-MODEL PRINTING METHOD, COMPUTING DEVICE AND MULTI-MODEL PRINTING APPARATUS

(71) Applicant: SEMES CO., LTD., Chungcheongnam-do (KR)

(72) Inventors: Kang Young Seo, Daegu (KR); Sung Su Kim, Chungcheongnam-do (KR); Su Beom Jeon, Chungcheongnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 0 days.

(21) Appl. No.: 17/985,378

(22) Filed: Nov. 11, 2022

(65) Prior Publication Data

US 2024/0078056 A1    Mar. 7, 2024

(30) Foreign Application Priority Data

Sep. 6, 2022 (KR) .................. 10-2022-0112648

(51) Int. Cl.
*G06F 3/12* (2006.01)
*G06K 15/02* (2006.01)
*G06K 15/10* (2006.01)

(52) U.S. Cl.
CPC .......... *G06F 3/1205* (2013.01); *G06F 3/1253* (2013.01); *G06F 3/126* (2013.01); *G06F 3/1267* (2013.01); *G06K 15/021* (2013.01); *G06K 15/102* (2013.01); *G06F 3/12* (2013.01)

(58) Field of Classification Search
None
See application file for complete search history.

(56) References Cited

U.S. PATENT DOCUMENTS

| | | | |
|---|---|---|---|
| 8,580,335 B2 | 11/2013 | Shinohara | |
| 2006/0018025 A1* | 1/2006 | Sharon ................. | H04N 9/3129 348/E9.026 |
| 2007/0052742 A1* | 3/2007 | Lee ........................ | G02B 5/201 347/9 |

(Continued)

FOREIGN PATENT DOCUMENTS

| KR | 10-2006-0128535 | 12/2006 |
|---|---|---|
| KR | 10-2010-0042585 A | 4/2010 |
| KR | 10-1960273 | 3/2019 |

(Continued)

OTHER PUBLICATIONS

Office action from corresponding Korean Patent Application No. 10-2022-0112648 dated Mar. 12, 2024 with English translation by Google Translate.

(Continued)

*Primary Examiner* — Darryl V Dottin
(74) *Attorney, Agent, or Firm* — Womble Bond Dickinson (US) LLP

(57) ABSTRACT

A multi-model printing method capable of increasing the freedom of printing and evaluating process for each cell is provided. The multi-model printing method comprises registering a first job for inkjet printing a first cell of a first size in a first region of a glass substrate, registering a second job for inkjet printing a second cell of a second size different from the first size in a second region of the glass substrate, and storing a recipe including the first job and the second job.

16 Claims, 15 Drawing Sheets

(56) References Cited

U.S. PATENT DOCUMENTS

2013/0329254 A1* 12/2013 Akashi ............... G06K 15/4065
358/1.15
2017/0200772 A1   7/2017 Yoshida

FOREIGN PATENT DOCUMENTS

KR   10-2022-0100117 A   7/2022
WO     2015/182098 A1   12/2015

OTHER PUBLICATIONS

Office Action dated May 28, 2024 for Japanese Patent Application No. 2022-200877 and its English translation provided by Global Dossier.

* cited by examiner

Fig. 8

| RECIPE_ITEM | VALUE |
|---|---|
| PRINT_RECIPE_ID1 ▽ | DYNAMIC_V1 |

Fig. 11

| RECIPE_ITEM | VALUE |
|---|---|
| PRINT_TOTAL_COUNT ▽ | 2 |
| PRINT_RECIPE_ID1 ▽ | 55INCH_2CELL |
| PRINT_RECIPE_ID2 ▽ | 65INCH_3CELL |

Fig. 12

| RECIPE_ITEM | VALUE |
|---|---|
| PRINT_TOTAL_COUNT ▽ | 1 |
| PRINT_RECIPE_ID1 ▽ | DYNAMIC_V1 |

MULTI-MODEL PRINTING METHOD, COMPUTING DEVICE AND MULTI-MODEL PRINTING APPARATUS

This application claims the benefit of Korean Patent Application No. 10-2022-0112648, filed on Sep. 6, 2022, in the Korean Intellectual Property Office, the disclosure of which is incorporated herein by reference in its entirety.

BACKGROUND

1. Field

The present invention relates to a multi-model printing method, a computing device and a multi-model printing facility.

2. Description of the Related Art

Research and development of light-emitting devices using a quantum dot (QD), which is inorganic light-emitting material, as light-emitting material are being actively conducted. A quantum dot is semiconductor material with a crystal structure of several nanometers in size, and can be composed of several hundred to several thousand atoms. Because a quantum dot is very small in size, it has a large surface area per unit volume. For this reason, most of the atoms exist on the surface of the nanocrystal, and exhibit a quantum confinement effect and the like. Due to this quantum confinement effect, a quantum dot can control the emission wavelength only by adjusting the size, and have characteristics such as excellent color purity and high PL (photoluminescence) luminous efficiency. A light emitting device using a quantum dot may include a device having a multilayer structure including a hole transport layer (HTL) and an electron transport layer (ETL) on both sides with a quantum dot emitting layer interposed therebetween.

SUMMARY

Meanwhile, cells having different sizes may be printed on one glass substrate. For example, a 55-inch cell and a 66-inch cell can be printed on a single glass substrate. Conventionally, cells having different sizes were printed on the entire glass substrate using a single recipe. However, if this method is used, the printing freedom is reduced, and it is difficult to evaluate the process for each cell.

The object of the present invention is to provide a multi-model printing method capable of increasing the printing freedom and evaluating the process for each cell.

The object of the present invention is to provide a computing device for performing the multi-model printing method.

The object of the present invention is to provide a multi-model printing facility capable of increasing the printing freedom and evaluating the process for each cell.

The objects of the present invention are not limited to the objects mentioned above, and other objects not mentioned will be clearly understood by those skilled in the art from the following description.

One aspect of the multi-model printing method of the present invention for achieving the above object comprises registering a first job for inkjet printing a first cell of a first size in a first region of a glass substrate, registering a second job for inkjet printing a second cell of a second size different from the first size in a second region of the glass substrate, and storing a recipe including the first job and the second job.

One aspect of the computing device of the present invention for achieving the above other object comprises a display unit for displaying a screen; an input unit for receiving a user's input to display the user's input on the display unit; and a control unit for controlling the display unit and the input unit, wherein the display unit displays a first input region for inputting a total number of prints for printing on a glass substrate, and a second input region activated according to a total number of prints input to the first input region, wherein the second input region comprises, a first registration region for inputting a first job for inkjet printing a first cell of a first size in a first region of the glass substrate, and a second registration region for inputting a second job for inkjet printing a second cell of a second size in the second region of the glass substrate.

One aspect of the multi-model printing facility of the present invention for achieving the above another object comprises an indexer for obtaining a distinguishing factor indicating information for processing a glass substrate; a facility operation unit for receiving the distinguishing factor from the indexer and receiving a recipe corresponding to the distinguishing factor from an integrated controller (CTC); and a model management unit for providing control information necessary for printing operation based on the recipe, wherein the recipe includes, a first job for inkjet printing a first cell of a first size in a first region of the glass substrate, and a second job for inkjet printing a second cell of a second size different from the first size in a second region of the glass substrate, wherein the facility operation unit provides first model information related to the first job to the model management unit, and the model management unit provides first control information for printing the first cell to the facility operation unit, wherein the facility operation unit prints a first cell on the glass substrate based on the first control information, wherein the facility operation unit provides second model information related to the second job to the model management unit, and the model management unit provides second control information for printing the second cell to the facility operation unit, wherein the facility operation unit includes printing a second cell on the glass substrate based on the second control information.

The details of other embodiments are included in the detailed description and drawings.

BRIEF DESCRIPTION OF THE DRAWINGS

These and/or other aspects will become apparent and more readily appreciated from the following description of the embodiments, taken in conjunction with the accompanying drawings in which:

FIG. 8 is a view for describing a third example of a registration region for registering a plurality of jobs;

FIG. 11 is a view for describing a first example of a first input region for inputting the total number of prints and a second input region for registering a job;

FIG. 12 is a view for describing a second example of a first input region for inputting the total number of prints and a second input region for registering a job;

DETAILED DESCRIPTION

Figure 1:
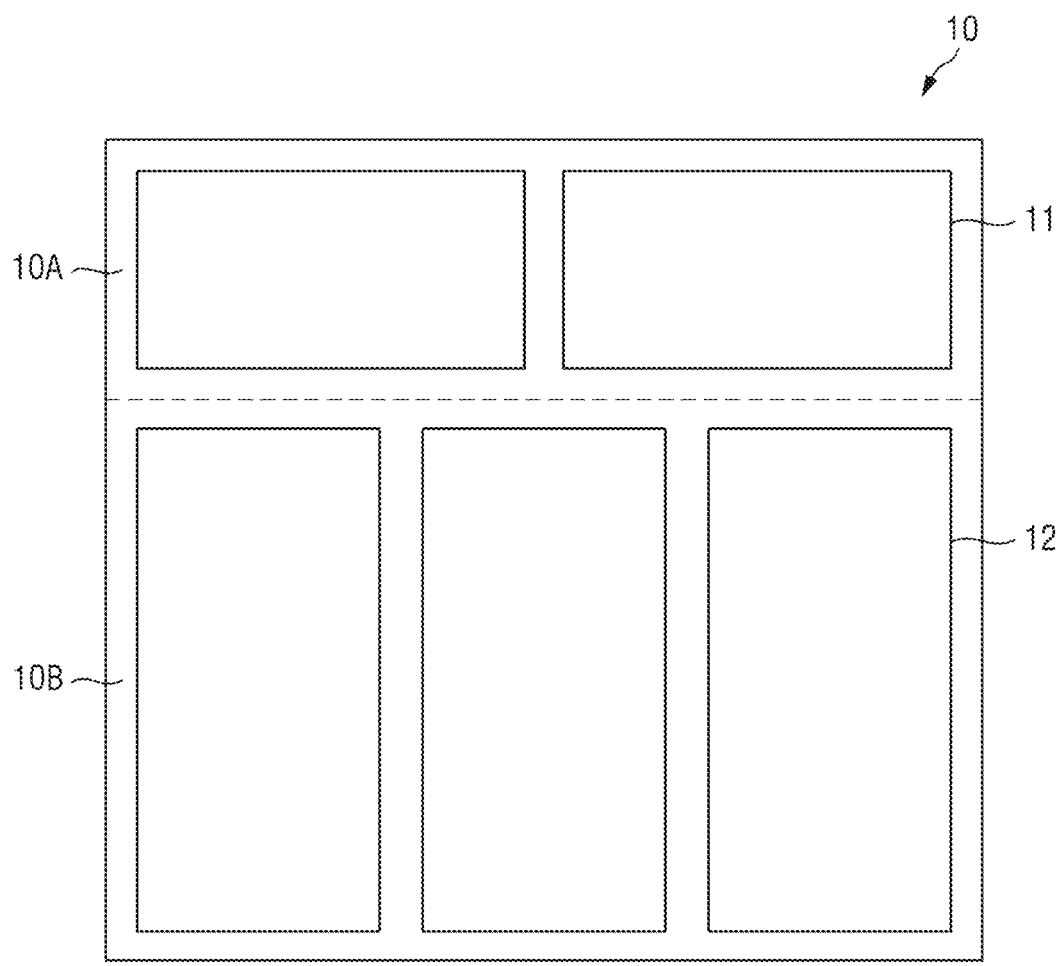
FIGS. 1 and 2 are views for describing a glass substrate to be used in a multi-model printing method according to some embodiments of the present invention.

Hereinafter, preferred embodiments of the present disclosure will be described in detail with reference to the accompanying drawings. Advantages and features of the present disclosure and methods of achieving them will become apparent with reference to the embodiments described below in detail in conjunction with the accompanying drawings. However, the present disclosure is not limited to the embodiments described below, but may be implemented in various different forms, and these embodiments are provided only for making the description of the present disclosure complete and fully informing those skilled in the art to which the present disclosure pertains on the scope of the present disclosure, and the present disclosure is only defined by the scope of the claims. Like reference numerals refer to like elements throughout.

Spatially relative terms "below," "beneath," "lower," "above," and "upper" can be used to easily describe a correlation between an element or components and other elements or components. The spatially relative terms should be understood as terms including different orientations of the device during use or operation in addition to the orientation shown in the drawings. For example, when an element shown in the figures is turned over, an element described as "below" or "beneath" another element may be placed "above" the other element. Accordingly, the exemplary term "below" may include both directions below and above. The device may also be oriented in other orientations, and thus spatially relative terms may be interpreted according to orientation.

Although first, second, etc. are used to describe various elements, components, and/or sections, it should be understood that these elements, components, and/or sections are not limited by these terms. These terms are only used to distinguish one element, component, or section from another element, component, or section. Accordingly, the first element, the first component, or the first section mentioned below may be the second element, the second component, or the second section within the technical spirit of the present disclosure.

Hereinafter, embodiments of the present disclosure will be described in detail with reference to the accompanying drawings, and in the description with reference to the accompanying drawings, the same or corresponding components are given the same reference numbers, regardless of reference numerals in drawings, and an overlapped description therewith will be omitted.

Figure 2:
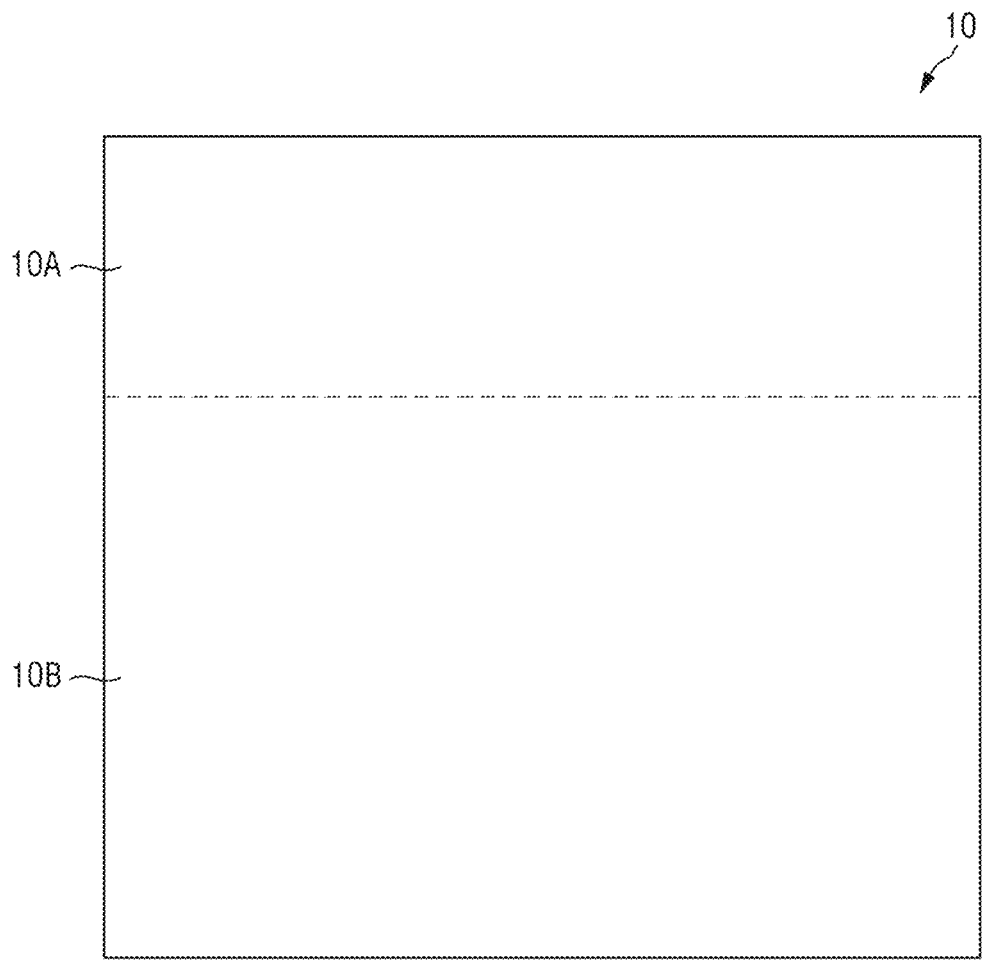

FIGS. 1 and 2 are views for describing a glass substrate to be used in a multi-model printing method according to some embodiments of the present invention.

Referring to FIGS. 1 and 2, the glass substrate 10 includes a first region 10A and a second region 10B. As shown, the first region 10A is a region, in which the first cell 11 of a first size is to be printed, and the second region 10B is a region, in which the second cell 12 of a second size different from the first size it to be printed. The second size may be larger than the first size, but is not limited thereto. For example, the first size is for a 55-inch display device, and the second size is for a 65-inch display device, but is not limited thereto.

In the first region 10A, the plurality of first cells 11 may be arranged so that their short sides face each other, and in the second region 10B, the plurality of second cells 12 may be arranged so that their long sides face each other.

The printing facility may print ink including quantum dots in the first cell 11 and the second cell 12. When the printing facility prints in the first cell 11, the printing facility is controlled based on the first control information. When the printing facility prints in the second cell 12, the printing facility may be controlled based on the second control information different from the first control information. Here, the first control information/second control information may include a number of swaths, a shift amount of a nozzle, the number of pixels, a pixel pitch, etc., but is not limited thereto.

Figure 3:
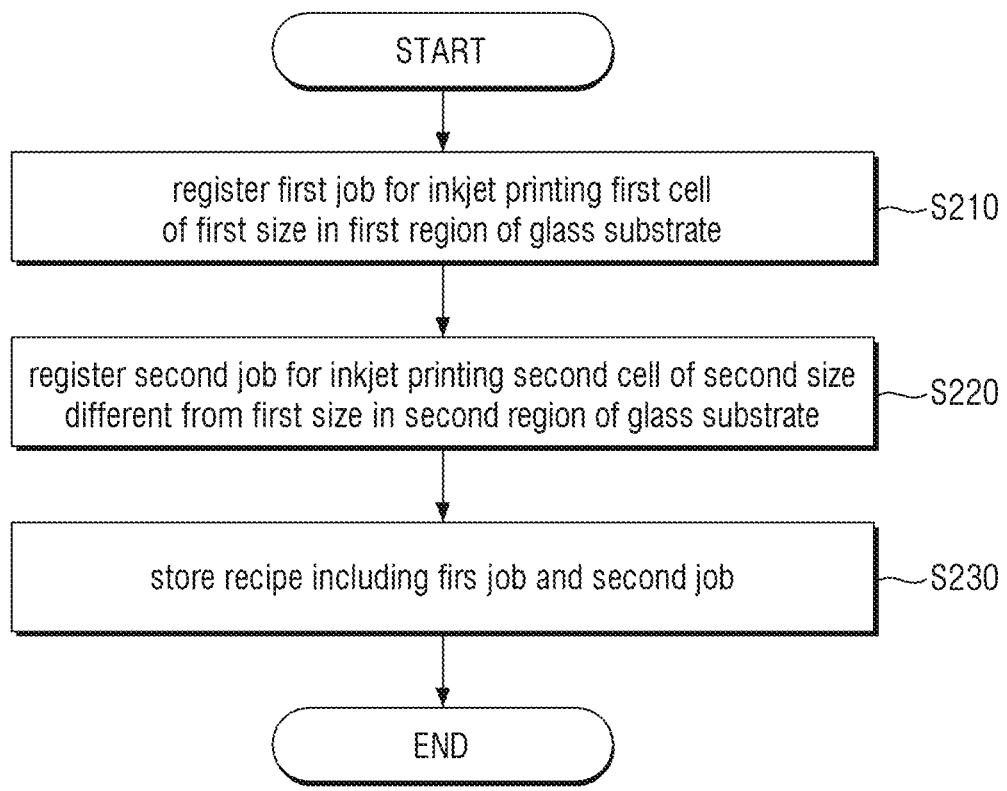
FIG. 3 is a flowchart illustrating a multi-model printing method according to the first embodiment of the present invention.
Figure 4:
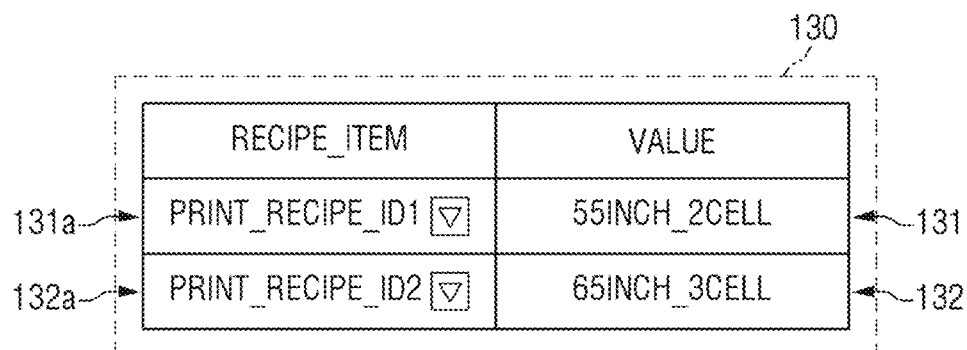
FIG. 4 is a view for describing a first example of a registration region for registering a plurality of jobs.
Figure 5:
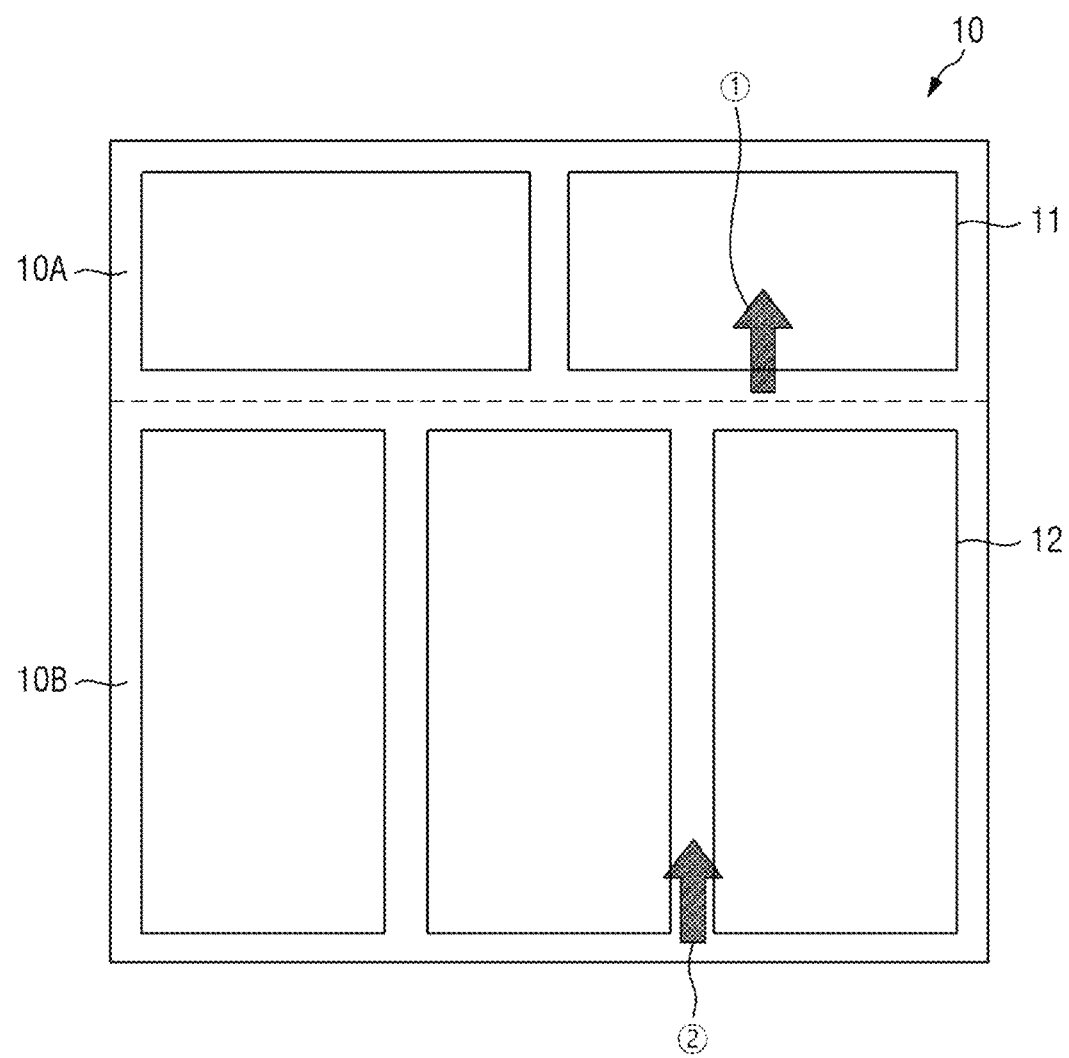
FIG. 5 is a view for describing a printing order according to the job registered in FIG. 4.

FIG. 3 is a flowchart illustrating a multi-model printing method according to the first embodiment of the present invention. FIG. 4 is a view for describing a first example of a registration region for registering a plurality of jobs. FIG. 5 is a view for describing a printing order according to the job registered in FIG. 4.

First, referring to FIG. 3, a first job for inkjet printing a first cell (see 11 in FIG. 1) of a first size in a first region (see 10A in FIG. 1) of the glass substrate is registered (S210).

Specifically, as shown in FIG. 4, registration regions 131*a* and 132*a* may be displayed on the display unit 130.

As shown, the registration regions 131*a* and 132*a* may be in the form of a table. The first registration region 131*a* is indicated by PRINT_RECIPE_ID1. The first registration region 131*a* means an item to be printed first.

The second registration region 132*a* is indicated by PRINT_RECIPE_ID2. The second registration region 132*a* means an item to be printed second.

The first registration region 131*a* is disposed above the second registration region 132*a*. A first job registered in the first registration region 131*a* may be performed before a second job registered in the second registration region 132*a*.

Here, the user registers the first job 131 in the first registration region 131*a*. The first job 131 is indicated as 55 INCH_2CELL. "55 INCH_2CELL" means a job, in which two first cells of 55-inch are printed.

Next, a second job for inkjet printing a second cell (see 12 in FIG. 1) of a second size different from the first size in the second region (see 10B in FIG. 1) of the glass substrate is registered (S220).

Specifically, as shown in FIG. 4, the user registers the second job 132 in the second registration region 132*a*. The second job 132 is indicated as 65 INCH_3CELL. "65 INCH 3CELL" may mean that three second cells of 65-inch are printed.

Subsequently, a recipe including the first job 131 and the second job 132 is stored (S230).

When the recipe is stored as above, inkjet printing is performed in the same order as shown in FIG. 5.

That is, according to the first job 131 stored as an item to be printed first, a first cell (see 11 in FIG. 5) of a first size is inkjet printed in the first region (see 10A in FIG. 5) of the glass substrate (see reference numeral ① in FIG. 5).

According to the second job 132 stored as the item to be printed second, a second cell (see 12 in FIG. 5) of a second size different from the first size is inkjet printed in the second region (see 10B in FIG. 5) of the glass substrate (see reference numeral ② in FIG. 5).

As will be described later, the first control information used when performing the first job and the second control information used when performing the second job are different from each other. Therefore, it is possible to use a control method suitable for the first job (i.e., a control method optimized for printing the first cell of the first size). It is possible to use a control method suitable for the second job (i.e., a control method optimized for printing the second cell of the second size). Accordingly, it is possible to increase the printing freedom when performing each job.

In addition, since the glass substrate is printed by dividing it into a plurality of jobs, it is possible to accurately evaluate whether each of the plurality of jobs is properly performed. In addition, it is also possible to stop printing and perform evaluation even when only one job among a plurality of jobs is performed and the other jobs are not performed. Therefore, it is also easy to evaluate each job.

Figure 6:
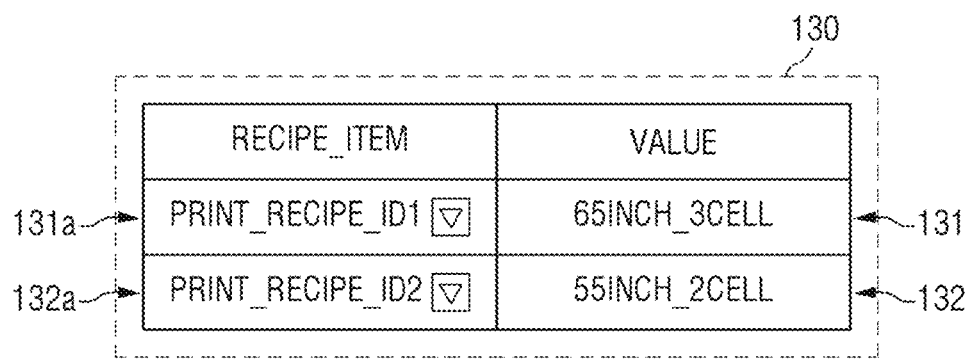
FIG. 6 is a view for describing a second example of a registration region for registering a plurality of jobs.
Figure 7:
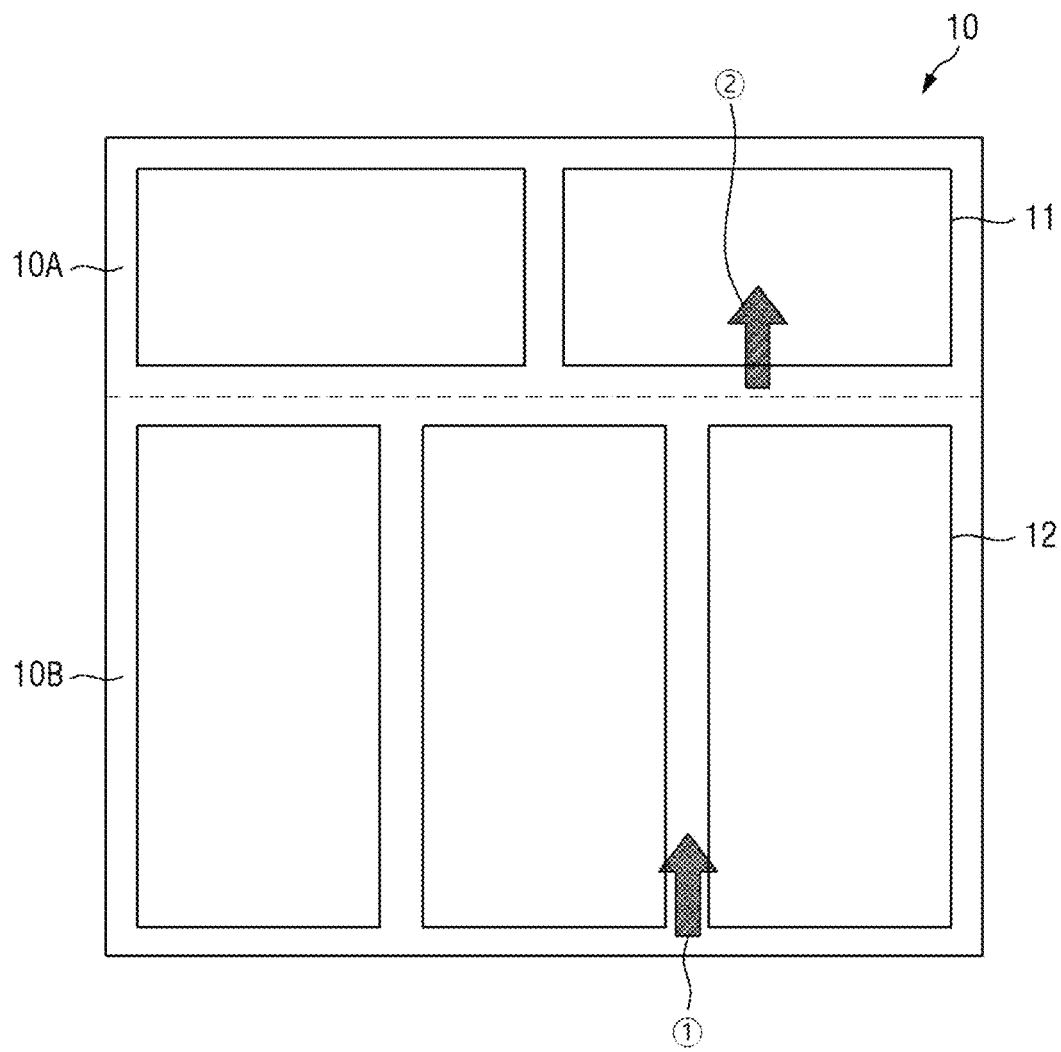
FIG. 7 is a view for describing a printing order according to the job registered in FIG. 6.

FIG. 6 is a view for describing a second example of a registration region for registering a plurality of jobs. FIG. 7 is a view for describing a printing order according to the job registered in FIG. 6.

Referring to FIG. 6, 65 INCH_3CELL is registered as the first job 131 in the first registration region 131a. 55 INCH_2CELL is registered in the second registration region 132a as the second job 132.

According to the registered jobs 131 and 132, a 65-inch cell (see 12 in FIG. 7) corresponding to the first job 131 is first printed (see reference numeral ① in FIG. 7). Subsequently, a 55-inch cell (see 11 in FIG. 7) corresponding to the second job 132 is printed (see reference numeral ② in FIG. 7). Here, the control information used when performing the first job and the control information used when performing the second job are different from each other.

Figure 9:
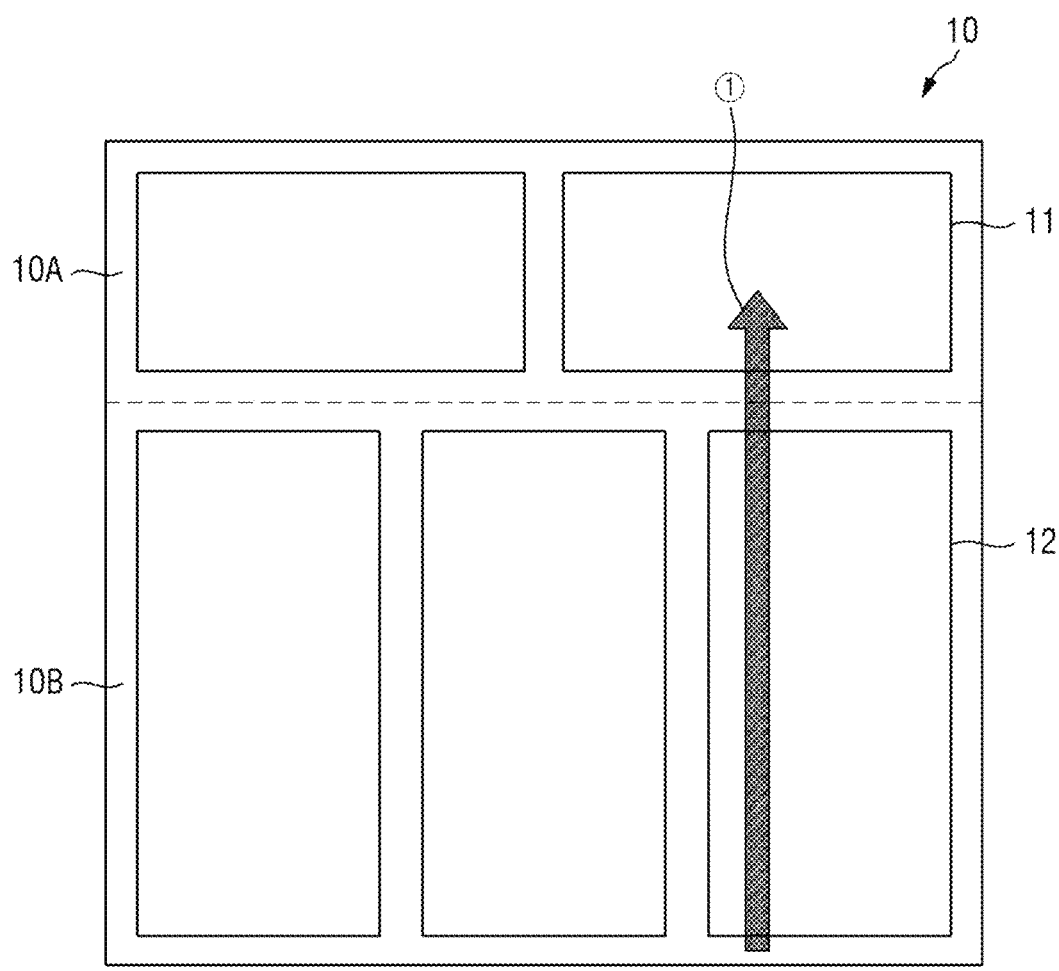
FIG. 9 is a view for describing a printing order according to the job registered in FIG. 8.

FIG. 8 is a view for describing a third example of a registration region for registering a plurality of jobs. FIG. 9 is a view for describing a printing order according to the job registered in FIG. 8.

Referring to FIG. 8, DYNAMIC_V1 is registered as a third job 133 in the third registration region 133a.

According to the registered job 133, a 65-inch cell (see 12 in FIG. 9) is first printed in the second region (see 10B in FIG. 9) of the glass substrate, and then a 55-inch cell (see 11 in FIG. 9) is printed in the first region (see 10A in FIG. 9) of the glass substrate (see reference numeral ① in FIG. 9). Here, control information when printing a 65-inch cell and control information when printing a 55-inch cell may be the same.

Figure 10:
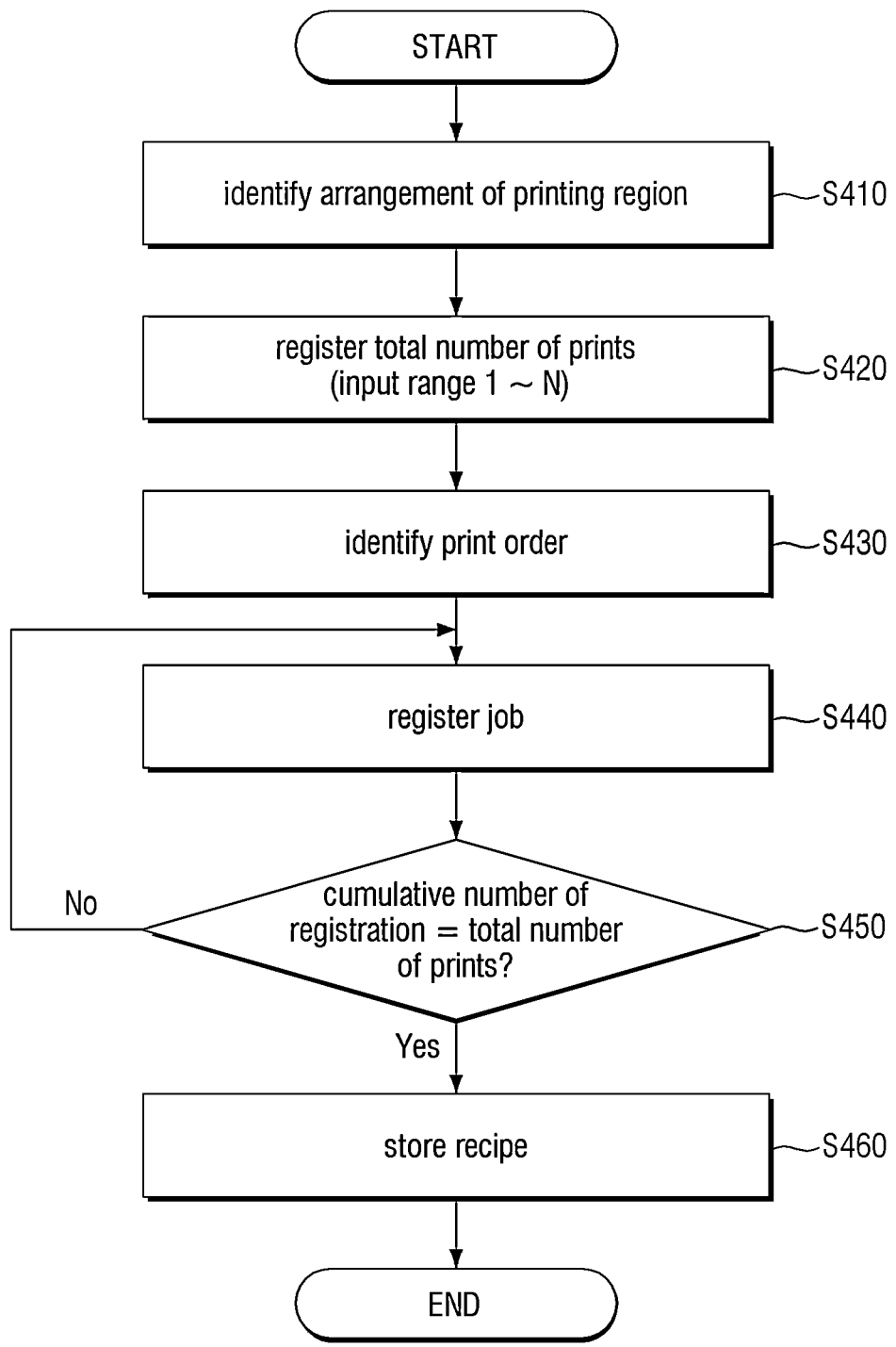
FIG. 10 is a flowchart illustrating a multi-model printing method according to a second embodiment of the present invention.

FIG. 10 is a flowchart illustrating a multi-model printing method according to a second embodiment of the present invention. FIG. 11 is a view for describing a first example of a first input region for inputting the total number of prints and a second input region for registering a job.

Referring to FIG. 10, the user identifies the arrangement of the printing region on the glass substrate (S410).

For example, on the glass substrate (see 10 in FIG. 1), a user identifies in advance a first region (see 10A in FIG. 1), which is a region, in which a first cell (see 11 in FIG. 1) of a first size is to be printed, and a second region (see 10B in FIG. 1), which is a region, in which a second cell (see 12 of FIG. 1) of a second size is to be printed.

The user may only identify the preset printing region as shown in FIG. 1, but the user may define a plurality of printing regions (i.e., regions, in which different types of cells are printed) on the glass substrate.

Next, the user registers the total number of prints (S420).

For example, referring to FIG. 11, a first input region 135a and a second input region 136a may be displayed on the display unit 130. The first input region 135a is a region for inputting the total number of prints 135 (i.e., the total number of jobs to be registered) for printing the glass substrate. The second input region 136a is activated according to the total number of prints 135 input to the first input region 135a, and is a region for inputting a job. For example, the user inputs two as the total number of prints 135 in the first input region 135a (see reference numeral 135). If the total number of prints 135 is two, the registration regions 131a and 132a activated in the second input region 136a may be two.

Next, the user identifies the print order on the glass substrate (S430).

Specifically, in the second input region 136a, the first job 131 registered in the first registration region 131a is printed first, and the second job 132 registered in the second registration region 132a is printed later. Therefore, before registering the jobs 131 and 132 in the registration regions 131a and 132a, the user should first identify what order they are printed on the glass substrate.

In the following, for example, it is assumed that the user has identified that a 55-inch cell should be printed first, and a 65-inch cell should be printed later.

Next, the user registers a job in the registration region (S440).

Specifically, in step S430, the user first registers 55 INCH 2CELL, which is the first job 131, in the first registration region 131a because the user has identified that print should be performed in the order of the 55-inch cell and the 65-inch cell.

Next, it is compared whether the accumulated number of registered jobs and the total number of prints are the same (S450).

Specifically, if the cumulative number of registered jobs and the total number of prints are the same (Yes in S450), the process advances to the next step (S460). If the accumulated number of registered jobs is less than the total number of prints (No in S450), the process returns to the previous step (S440).

For example, since the total number of prints registered in step S420 is two and the number of jobs registered in step S440 is one, the process returns to the previous step (S440).

Next, in step S440, the user additionally registers a job in the registration region. Specifically, the user additionally registers 65 INCH 3CELL, which is the second job 132, in the second registration region 132a.

Subsequently, in step S450, since the accumulated number of registered jobs and the total number of prints are the same to two, the process advances to the next step (S460).

Next, the recipe including the registered job is stored (S460). That is, the stored recipe includes a plurality of different jobs 131 and 132.

According to steps S430 and S440, the order, in which a plurality of jobs are printed, is determined according to the order, in which they are registered. Alternatively, it is also possible to determine the order from which region to print after registering a plurality of jobs to be printed in a plurality of regions (i.e., after registering jobs to be printed for each region). That is, the order, in which jobs are registered, and the order, in which they are printed, may be set differently.

Meanwhile, in step S420, if the total number of prints is 1, since one job is registered, the entire glass substrate is printed (regardless of the plurality of printing regions). In addition, if the total number of prints is 2 or more, since the number of registered jobs is 2 or more, the glass substrate is printed for each of a plurality of printing regions. Accordingly, inputting the total number of prints may correspond to determining whether to print the entire glass substrate based on the same control information or to print for each of a plurality of regions of the glass substrate based on different control information.

FIG. 12 is a view for describing a second example of a first input region for inputting the total number of prints and a second input region for registering a job.

Referring to FIG. 12, a first input region 135a and a second input region 136a are displayed on the display unit 130. The user inputs one as the total number of prints 135 in the first input region 135a. If the total number of prints 135 is one, the registration region 131a activated in the second input region 136a may be one.

The user registers the job 131 DYNAMIC_V1 in the activated registration region 131a. DYNAMIC_V1 may be a job for printing a 55-inch cell and a 65-inch cell under the same control condition, but is not limited thereto.

Meanwhile, although not described in a separate drawing, if the total number of prints 135 is three or more, the activated registration region also may be three or more to match the total number of prints 135.

Figure 13:
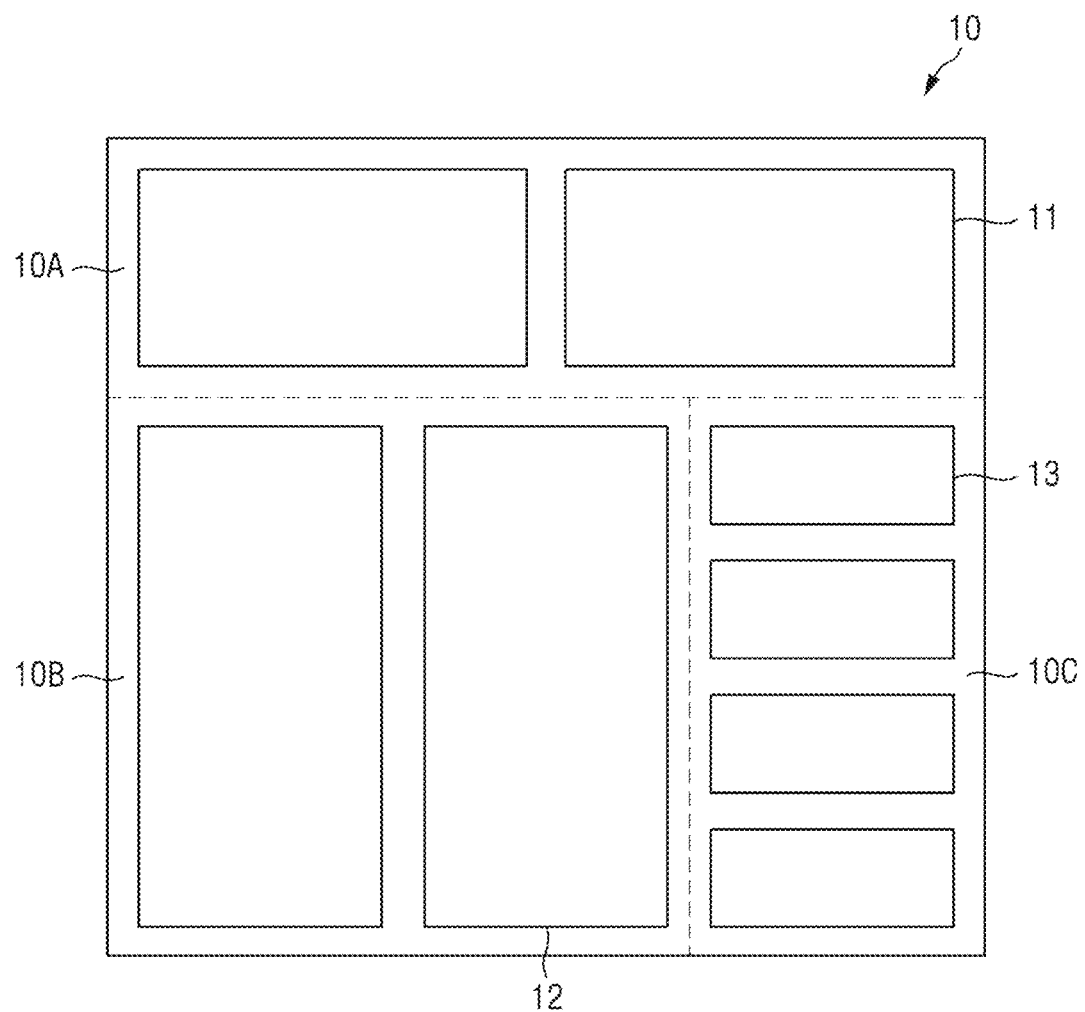
FIG. 13 is a view for describing another example of a glass substrate to be used in a multi-model printing method according to some embodiments of the present invention.

FIG. 13 is a view for describing another example of a glass substrate to be used in a multi-model printing method according to some embodiments of the present invention. For convenience of description, the points different from those described with reference to FIGS. 1 and 2 will be mainly described.

Referring to FIG. 13, the glass substrate 10 includes a first region 10A, a second region 10B, and a third region 10C. As shown, the first region 10A is a region, in which the first cell 11 of a first size is to be printed, the second region 10B is a region, in which a second cell 12 of a second size different from the first size is to be printed, and the third region 10C is a region, in which the third cell 13 of a third size different from the first and second sizes is to be printed. The second size may be larger than the first size, and the third size may be smaller than the first size, but is not limited thereto. For example, the first size is for a 55-inch display device, the second size is for a 65-inch display device, and the third size is for a 34-inch display device, but is not limited thereto.

In the first region 10A, the plurality of first cells 11 may be arranged so that their short sides face each other, and in the second region 10B, the plurality of second cells 12 may be arranged so that their long sides face each other. In the third region 10C, a plurality of third cells 13 may be arranged so that their long sides face each other.

In order to print as shown in FIG. 13, a first job to be printed in the first region of the glass substrate is registered, and a second job to be printed in the second region of the glass substrate is registered, and then a third job to be printed in the third region of the glass substrate is registered. Subsequently, a recipe including the first job, the second job, and the third job may be stored.

Figure 14:
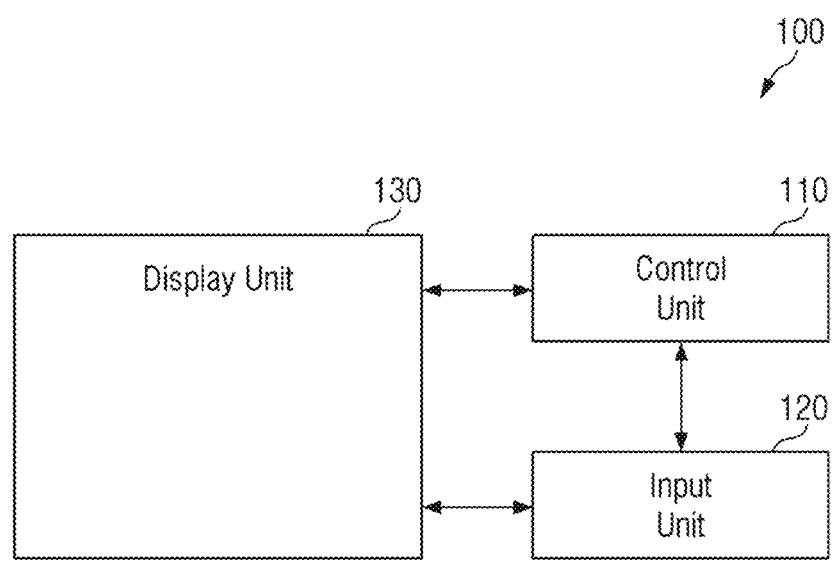
FIG. 14 is a view for describing a computing device to be used in a multi-model printing method according to some embodiments of the present invention.

FIG. 14 is a diagram for describing a computing device to be used in a multi-model printing method according to some embodiments of the present invention.

Referring to FIG. 14, the multi-model printing method according to some embodiments of the present invention may be performed by the computing device 100. The computing device 100 may be used to set a recipe for printing a multi-model. The computing device 100 may correspond to an integrated controller (see reference numeral 3 of FIG. 15) to be described later.

The computing device 100 may include at least one of, for example, a workstation, a server, a desktop PC, a laptop PC, a netbook computer, a tablet PC, a smart phone, a mobile phone, a video phone, an e-book reader, a PDA, a portable multimedia player (PMP), an MP3 player, a medical device, a camera, or a wearable device.

The computing device 100 includes a display unit 130, an input unit 120, and a control unit 110.

The input unit 120 receives the user's input in order to display the user's input on the display unit 130.

The display unit 130 displays the input region (e.g., 135a and 136a of FIG. 11) and/or the registration region (e.g., FIGS. 131a and 132a of FIG. 11) as described in FIGS. 4, 6, 8, 11 and 12. A user's input through the input unit 120 is displayed in the input region and the registration region.

The control unit 110 controls the display unit 130 and the input unit 120.

Although not shown separately, the computing device 100 may further include a memory. Memory may include volatile memory (e.g., DRAM, SRAM, or SDRAM) and/or non-volatile memory (e.g., one time programmable ROM (OTPROM), PROM, EPROM, EEPROM, mask ROM, flash ROM, flash memory, PRAM, RRAM, MRAM, hard drive, or solid state drive (SSD)). The memory may include internal memory and/or external memory. The memory may store, for example, instructions or data related to at least one other component of the computing device 100. The memory may also store software and/or programs.

Instructions for performing the multi-model printing method described with reference to FIGS. 3 to 13 may be stored in the memory.

For example, it may include instructions for registering a first job for inkjet printing a first cell of a first size in a first region of a glass substrate, registering a second job for inkjet printing a second cell of a second size different from the first size in a second region of the glass substrate, and storing a recipe including the first job and the second job.

Also, it may include instructions for registering the total number of prints before registering the first job.

Also, it may include instructions for determining a job to be performed first among the first job and the second job.

Also, it may include instructions for defining a plurality of regions for printing cells of different types on the glass substrate before registering the first job.

Figure 15:
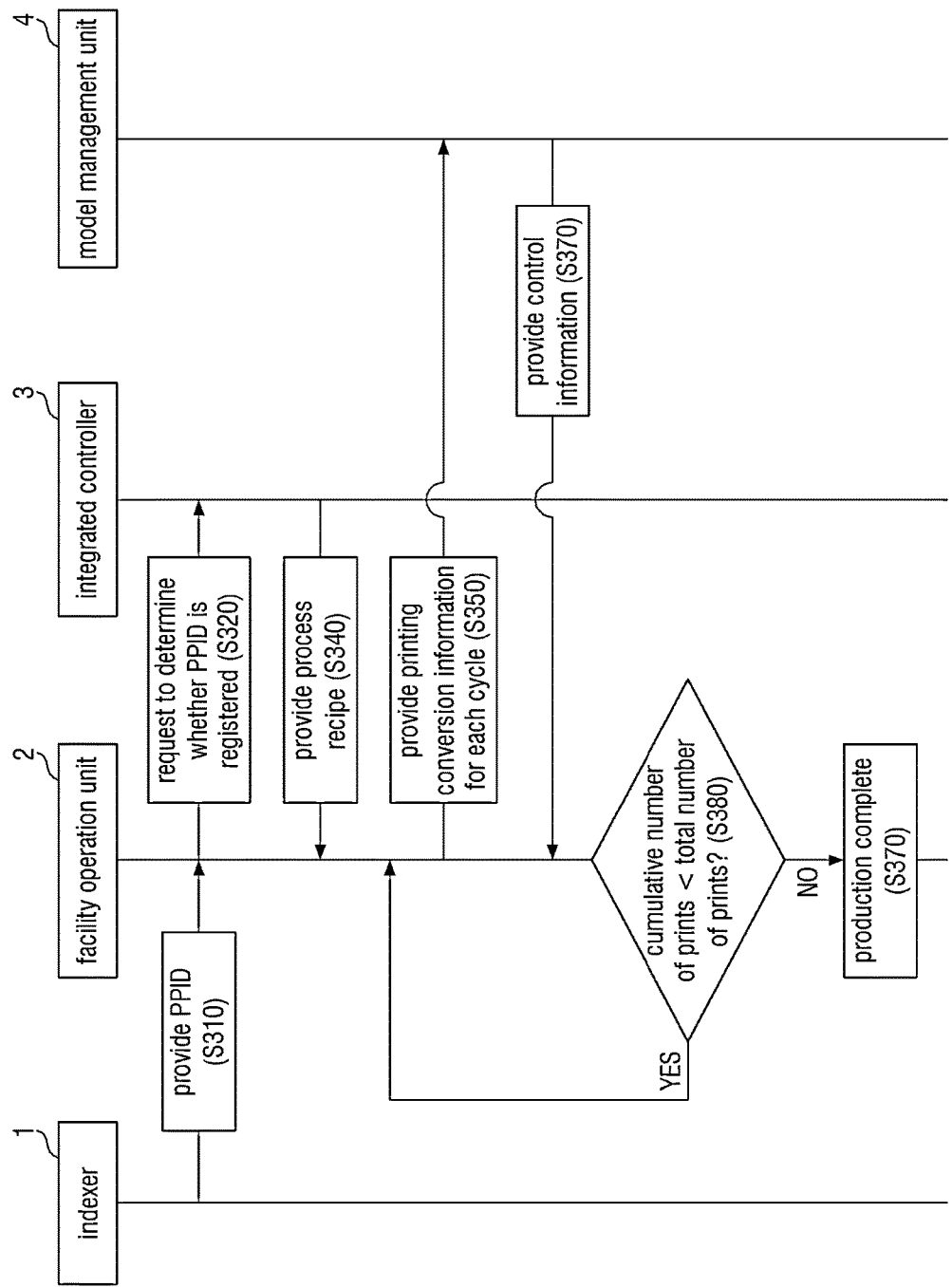
FIG. 15 is a view for describing a multi-model printing facility to be used in a multi-model printing method according to some embodiments of the present invention.

FIG. 15 is a view for describing a multi-model printing facility to be used in a multi-model printing method according to some embodiments of the present invention.

Referring to FIG. 15, the multi-model printing facility includes an indexer 1, a facility operation unit 2, an integrated controller 3, a model management unit 4, and the like.

The indexer 1 obtains a distinguishing factor PPID indicating information for processing a glass substrate. For example, the indexer 1 may read the distinguishing factor PPID corresponding to the glass substrate to obtain the distinguishing factor PPID.

The facility operation unit 2 operates the printing facility. The facility operation unit 2 receives the distinguishing factor PPID from the indexer 1 and receives a recipe corresponding to the distinguishing factor PPID from the integrated controller CTC. Here, the recipe is described with reference to FIGS. 3 to 13, and may be, for example, a recipe stored through the steps described in FIG. 10.

The integrated controller 3 may overall manage facilities inside the FAB, such as a printing facility, a substrate transport facility, and a developing facility, and communicate with a customer's system. The integrated controller 3 may receive model information (e.g., specific information of 34, 55, and 65-inch models) from a customer's system.

The model management unit 4 provides control information necessary for printing operation to the facility operation unit 2 based on the recipe.

To describe the operation in detail, the indexer 1 reads the distinguishing factor PPID corresponding to the glass substrate to be processed and provides it to the facility operation unit 2 (S310).

The facility operation unit 2 provides the distinguishing factor PPID provided from the indexer 1 to the integrated controller 3, and requests to determine whether the distinguishing factor PPID is registered (S320).

When the integrated controller 3 receives the distinguishing factor PPID from the facility operation unit 2, the integrated controller 3 provides the stored recipe (process recipe) to the facility operation unit 2 (S340).

Specifically, the integrated controller 3 determines whether the distinguishing factor PPID is registered. That is, the integrated controller 3 determines whether there is a recipe (process recipe) corresponding to the distinguishing factor PPID, and if there is, provides the process recipe to the facility operation unit 2. The relationship between the distinguishing factor PPID and the process recipe will be described in detail later with reference to FIG. 16.

As described above with reference to FIGS. 3 and 10, the user can determine a recipe (process recipe) by registering a job in the registration region, and the determined recipe is stored together with the corresponding distinguishing factor PPID. When a user registers a job, the integrated controller 3 may complete a recipe based on model information corresponding to the registered job (i.e., model information provided from a customer system). The recipe completed in this way is provided to the facility operation unit 2.

Hereinafter, for example, the recipe, in which the total number of prints is two, and a first job for printing a first cell of a first size, and a second job for printing a second cell of a second size are included, is described.

Next, the facility operation unit 2 provides the printing conversion information for each cycle to the model management unit 4 (S350). For example, the facility operation unit 2 provides the model management unit 4 with first model information related to the first job.

Next, the model management unit 4 provides first control information for performing the first job (i.e., for printing the first cell) to the facility operation unit 2 (S370). Here, the first control information may include, for example, at least one of a number of swaths, a shift amount of a nozzle, the number of printing pixels, and a pixel pitch, but is not limited thereto.

The facility operation unit 2 controls the printing facility based on the received first control information to print the first cell in the first region of the glass substrate.

Next, it is determined whether the accumulated number of prints is smaller than the total number of prints (S380).

Since the cumulative number of prints (i.e., one) is less than the total number of prints (i.e., two) (YES in S380), the process returns to step S350.

The facility operation unit 2 again provides the printing conversion information for each cycle to the model management unit 4 (S350). For example, the facility operation unit 2 provides the second model information related to the second job to the model management unit 4.

The model management unit 4 provides second control information for performing the second job (i.e., for printing the second cell) to the facility operation unit 2 (S370). Here, the second control information may include, for example, at least one of a number of swaths, a shift amount of a nozzle, the number of pixels, and a pixel pitch, but is not limited thereto.

The facility operation unit 2 controls the printing facility based on the received second control information to print the second cell on the glass substrate.

Next, it is determined whether the accumulated number of prints is smaller than the total number of prints (S380).

Since the cumulative number of prints (i.e., two) is equal to the total number of prints (i.e., two) (NO in S380), the process advances to step S390.

Since the printing has progressed as many times as the total number of prints, the printing operation is completed. The produced glass substrate is discharged out of the printing facility (S390).

Figure 16:
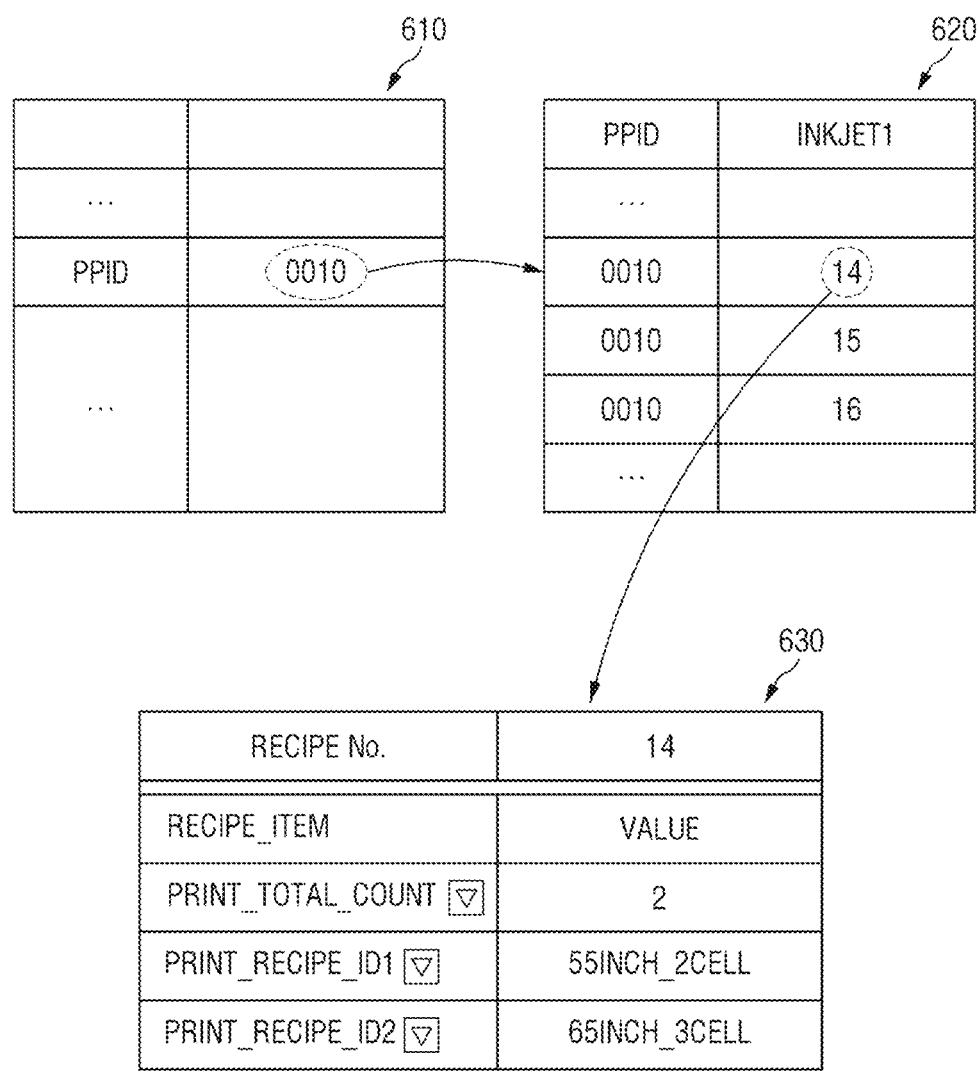
FIGS. 16 and 17 are views for describing a distinguishing factor, a flow recipe, and a process recipe.

FIG. 16 is a diagram for describing a distinguishing factor, a flow recipe, and a process recipe.

The distinguishing factor PPID is used to process the glass substrate based on automated processing. The PPID of the automation system and the facility is used as the same distinguishing factor, and it is not used as a duplicate name within one facility. In addition, one glass information has one distinguishing information PPID and is configured to be used as a process distinguishing factor. The distinguishing factor PPID corresponds to a flow recipe indicating a facility used for processing a glass substrate and a process recipe indicating a processing method performed using the facility indicated by the flow recipe.

As a specific example, referring to reference numeral 610, a value corresponding to the distinguishing factor PPID may be 0010. The value 0010 is merely exemplary.

Referring to reference numeral 620, a process recipe may be designated and registered in a flow recipe corresponding to 0010, which is a PPID (e.g., it may be 14, 15, 16). Here, 14, 15, and 16 are PPID (process recipe) numbers used to process each glass substrate. For example, it is possible to perform a process for each process recipe registered for each distinguishing factor. According to the recipe registered in the PPID, in case of PPID 0010, process of 14 is performed, and in case of PPID 0060, process of 15 is performed. In addition, in case of PPID 0081, process of 16 may be performed.

In FIG. 16, the case used in the facility for each different PPID has been described by way of example.

Referring to reference numeral 630, a process recipe corresponding to a flow recipe (e.g., 14) will be described. A recipe is shown that specifically describes the process performed using the facility of 14.

Reference numeral 630 illustrates a case, in which the total number of prints is two and the first job and the second job are sequentially performed. The first job is to print two first cells of 55-inch in the first region of the glass substrate, and the second job is to print three second cells of 65-inch in the second region of the glass substrate.

Figure 17:
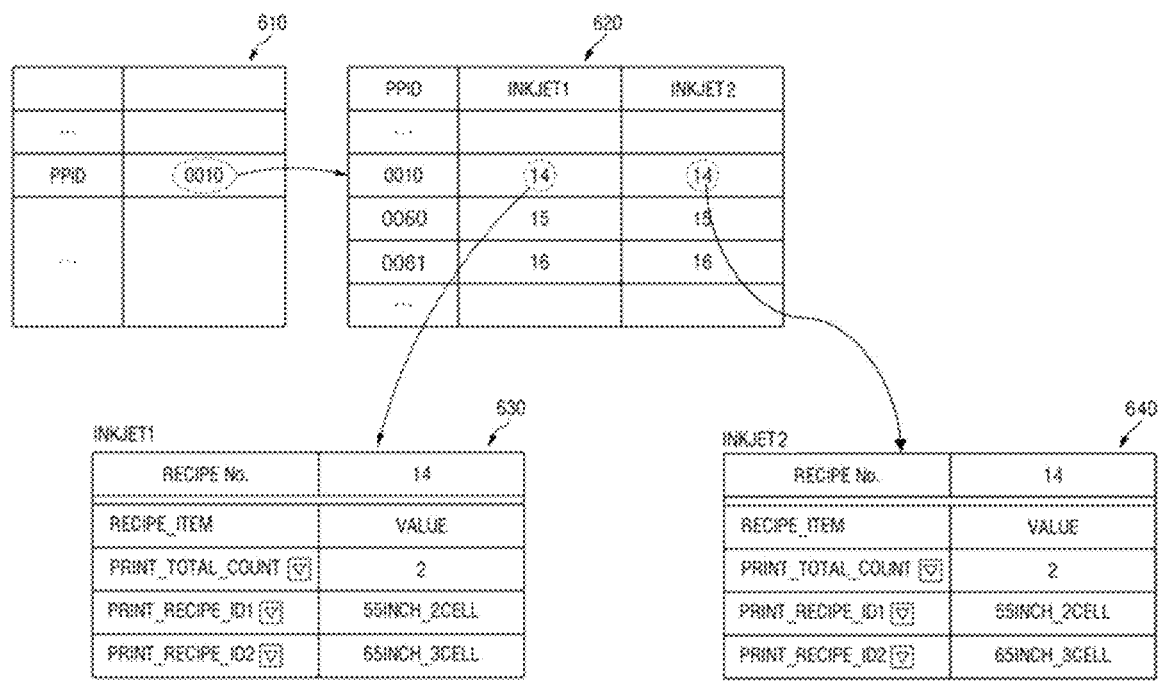

FIG. 17 describes a configuration, in which a plurality of internal facilities are included in the basis of one facility as the configuration of an automated facility. The part composed of each PPID (process recipe) in each of the different internal facilities (Inkjet1/Inkjet2) is described as an example.

Although embodiments of the present invention have been described with reference to the above and the accompanying drawings, those of ordinary skill in the art to which the present invention pertains can understand that the present invention can be practiced in other specific forms without changing its technical spirit or essential features. Therefore, it should be understood that the embodiments described above are illustrative in all respects and not restrictive.

What is claimed is:

1. A multi-model printing method comprising:
   registering a first job for inkjet printing a first cell of a first size in a first region of a glass substrate;
   registering a second job for inkjet printing a second cell of a second size different from the first size in a second region of the glass substrate;
   storing a recipe including the first job and the second job; and
   controlling a printing operation based on first control information for performing the first job and second control information for performing the second job, wherein the first control information and the second control information include at least one of a number of swaths, a shift amount of a nozzle, a number of pixels, and a pixel pitch.

2. The method of claim 1 further comprises,
   registering a total number of prints before registering the first job.

3. The method of claim 1 further comprises,
   determining a job to be performed first among the first job and the second job.

4. The method of claim 1 further comprises,
   defining a plurality of regions for printing cells of different types on the glass substrate before registering the first job.

5. The method of claim 1 further comprises,
   registering a third job for inkjet printing a third cell of a third size different from the first size and the second size in a third region of the glass substrate after registering the second job,
   storing the recipe comprises storing a recipe including the first job, the second job, and the third job.

6. The method of claim 1, wherein the glass substrate corresponds to a distinguishing factor indicating information for processing the glass substrate,
   wherein the distinguishing factor corresponds to a flow recipe indicating a facility used for processing the glass substrate, and a process recipe indicating a processing method performed using the facility indicated by the flow recipe,
   wherein the recipe including the first job and the second job is the process recipe.

7. The method of claim 1, wherein a facility operator receives a distinguishing factor of the glass substrate from an indexer,
   wherein the facility operator delivers first model information related to the first job to a model manager based on the distinguishing factor,
   wherein the facility operator receives the first control information for performing the first job from the model manager,
   wherein the facility operator includes controlling the printing operation based on the first control information.

8. The method of claim 7, wherein the facility operator delivers second model information related to a second job to a model manager,
   wherein the facility operator receives the second control information for performing the second job from the model manager,
   wherein the facility operator includes controlling the printing operation based on the second control information.

9. A computing device comprising:
   a display configured to display a screen;
   an inputter configured to receive a user's input to display the user's input on the display; and
   a controller configured to control the display and the inputter,
   wherein the display is configured to display:
   a first input region for inputting a total number of prints for printing on a glass substrate, and
   a second input region activated according to a total number of prints input to the first input region,
   wherein the second input region comprises:
   a first registration region for inputting a first job for inkjet printing a first cell of a first size in a first region of the glass substrate, and
   a second registration region for inputting a second job for inkjet printing a second cell of a second size in a second region of the glass substrate, and
   wherein the first job and the second job are performed based on first control information and second control information, respectively, wherein the first control information and the second control information include at least one of a number of swaths, a shift amount of a nozzle, a number of pixels, and a pixel pitch.

10. The computing device of claim 9, wherein, in the display, the first registration region is disposed above the second registration region.

11. The computing device of claim 10, wherein the second job is performed after the first job is performed.

12. The computing device of claim 9, wherein the glass substrate corresponds to a distinguishing factor indicating information for processing the glass substrate,
    wherein the distinguishing factor corresponds to,
    a flow recipe indicating a facility used for processing the glass substrate, and
    a process recipe indicating a processing method performed using the facility indicated by the flow recipe,
    wherein the inputted first job and second job constitute the process recipe.

13. A multi-model printing facility comprising:
    an indexer for obtaining a distinguishing factor indicating information for processing a glass substrate;
    a facility operator for receiving the distinguishing factor from the indexer and receiving a recipe corresponding to the distinguishing factor from an integrated controller (CTC); and
    a model manager for providing control information necessary for printing operation based on the recipe,
    wherein the recipe includes,
    a first job for inkjet printing a first cell of a first size in a first region of the glass substrate, and a second job for inkjet printing a second cell of a second size different from the first size in a second region of the glass substrate, wherein the facility operator provides first model information related to the first job to the model manager, and the model manager provides first control information for printing the first cell to the facility operator, then, the facility operator prints a first cell on the glass substrate based on the first control information, then, the facility operator provides second model information related to the second job to the model manager, and the model manager provides second control information for printing the second cell to the facility operator, then, the facility operator includes printing a second cell on the glass substrate based on the second control information.

14. The facility of claim 13, wherein the distinguishing factor corresponds to, a flow recipe indicating a facility used for processing the glass substrate, and a process recipe indicating a processing method performed using the facility indicated by the flow recipe, wherein the recipe provided by the integrated controller to the facility operator is a process recipe.

15. The facility of claim 13, wherein the first control information includes at least one of a number of swaths, a shift amount of a nozzle, the number of pixels, and a pixel pitch.

16. The facility of claim 13, wherein the integrated controller receives model information from a customer's system.

\* \* \* \* \*